United States Patent [19]
Aide

[11] 4,179,243
[45] Dec. 18, 1979

[54] FLOATATION PUMP DEVICE

[76] Inventor: Richard J. Aide, R.R. #2, Bismarck, N. Dak. 38501

[21] Appl. No.: 808,457

[22] Filed: Jun. 21, 1977

[51] Int. Cl.² ............................ F04B 21/00; B01F 3/04
[52] U.S. Cl. ..................................... 417/61; 417/334; 261/91; 285/283
[58] Field of Search ............... 417/334, 61; 261/91; 285/80, 184, 283

[56] References Cited
U.S. PATENT DOCUMENTS

| | | | |
|---|---|---|---|
| 123,825 | 2/1872 | Hamilton | 285/283 X |
| 3,345,092 | 10/1967 | Athman et al. | 285/283 |
| 3,515,377 | 6/1970 | Ray | 261/91 X |
| 3,631,880 | 1/1972 | Hansel | 417/61 X |
| 4,030,859 | 6/1977 | Henegar | 417/61 |
| 4,048,267 | 9/1977 | Walker | 285/283 X |

Primary Examiner—William L. Freeh
Assistant Examiner—R. E. Gluck
Attorney, Agent, or Firm—Robert E. Kleve

[57] ABSTRACT

The invention comprises a pumping device for pumping water from the bottom of a lake or reservoir. The device has a raft with pipe means pivotably mounted to the raft. A rotatable shaft is mounted to the raft having a propellor at its lower end located in the upper end of the pipe means with wind driven means to rotate the shaft. The pipe means is pivotable to either a vertical or horizontal position and has means to lock the pipe means in a vertical position whereby the pipe means may be retained in a horizontal position when positioning the raft in a lake or reservoir whereupon the pipe means may be pivoted to a vertical position.

1 Claim, 3 Drawing Figures

FLOATATION PUMP DEVICE

The invention relates to pumping devices more particularly. The invention relates to aerating devices for aerating lakes, ponds, and reservoirs and the like.

It is an object of the invention to provide a novel pumping device which has a telescoping pipe structure for pumping water from the bottom of a lake up to the surface of the lake, and which telescoping pipe is pivotally mounted to a raft to pivot from horizontal to a vertical position so that the device may be installed into the lake by moving the raft and telescoping structure out onto the lake while the pipe is horizontal and then allowing the pipe to pivot to a vertical position when the raft has reached the desired location in the lake for pumping.

It is an other object of the invention to provide a novel improved pumping device adapted to float on a lake for pumping water from the bottom of a lake, through a pipe which pipe is pivotally mounted for easier installation in the lake.

Further objects and advantages of the invention will become apparent as the description proceeds and when taken in conjunction with the accompanying drawings wherein.

Briefly stated, the invention comprises a pumping device for pumping water from the bottom of a lake for circulating and aerating the water, said pumping device has a raft to float the device upon the lake with a telescoping pipe structure and wind powered fans to rotate a propellor in the pipe structure to bring water up from the bottom of the lake through the pipe structure and which pipe structure is pivotally mounted to the raft for easier installation of the device in the lake.

Figure 1:
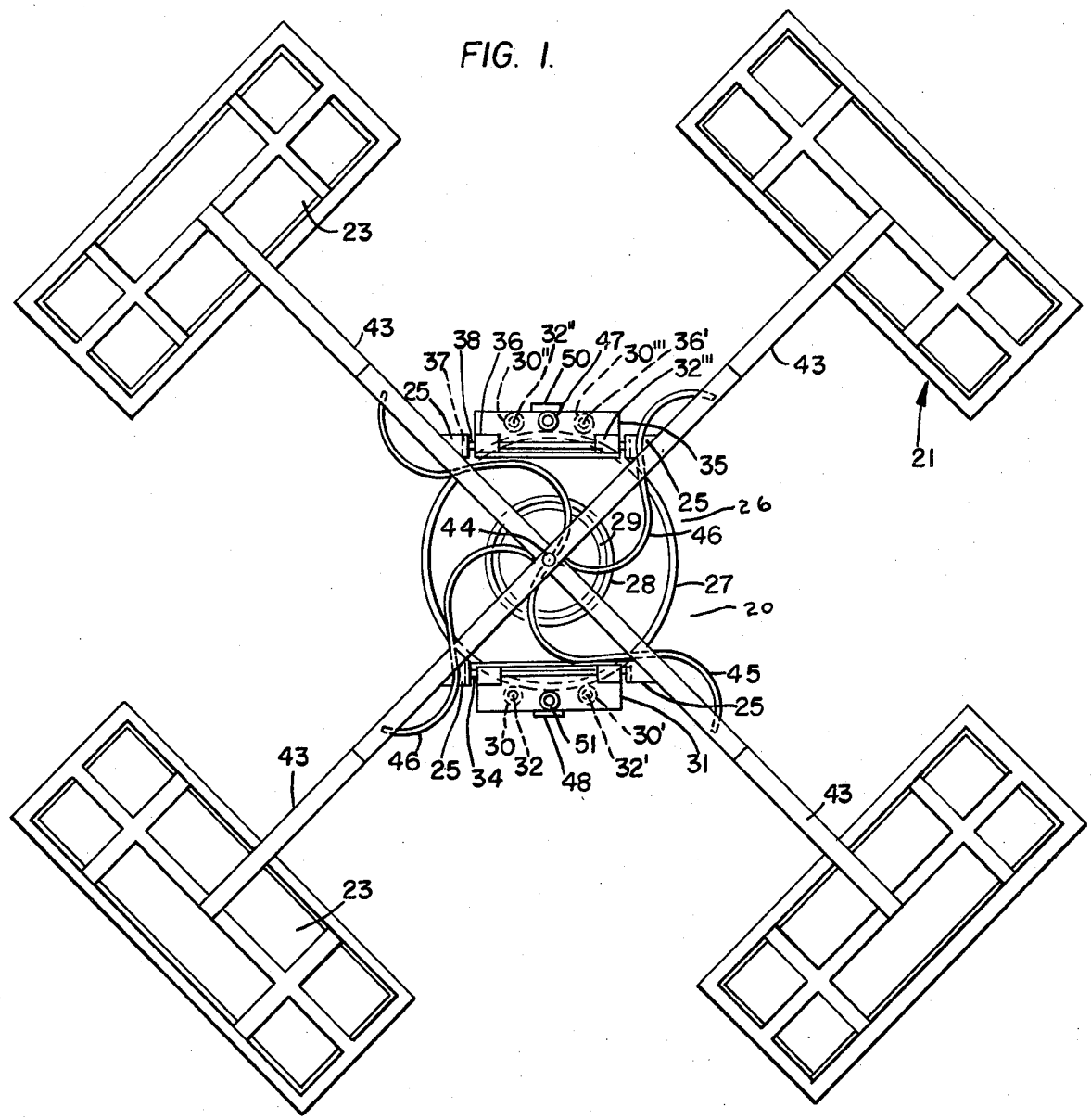
FIG. 1 is a top plan view of the pumping device having a pivotally mounted telescoping pipe.

Referring more particularly to the drawings in FIG. 1, the pump device 20 is illustrated as having a raft structure 21, with the raft structure 21 having four steel rods 22, and floats 23 mounted to the outer ends of the rods by means of a cage structure 24 fixed to the outer ends of the rods 22 which surround the floats 23 to form a raft.

The inner ends of the rods 22 have a pair of L-shaped flanges 25 fixed thereto and a telescoping pipe structure 26 pivotally mounted to the L-shaped flanges 25.

The telescoping pipe structure 26 has an enlarged upper chamber 27 and a small pipe 28 fixed to the bottom of the chamber 27 with an opening 27' in the bottom wall of the chamber 27 to allow fluid communication between the enlarged chamber 27 and the interior of the pipe 28.

A small pipe 29 is telescopingly mounted in the large pipe 28.

The upper side wall 28' of the enlarged chamber 27 has a pair of sleeves 30 and 30' fixed thereto to one side and a second pair of sleeves 30" and 30'" fixed to the other side of the side wall 28.

A L-shaped flange 31 has one pair of rods 32 and 32' fixed thereto at the upper end of the rods. The rods 32 and 32' are slidably mounted in the sleeves 30 and 30". The L-shaped flange 31 has a pair of sleeves 33 and 33' fixed thereto. Two of the L-shaped flanges 25 have bores 25' therethrough. A steel rod 34 passes through the bores 25" in the two L-shaped flanges 25 and through the sleeves 33 and 33' in the L-shaped flange 31 to thereby pivotally mount the L-shaped flange 31, the pair of rods 32 and 32', the sleeves 30 and 30', and the annular chamber 27, small pipes 28 and 29 to the four main rods 22 of the raft.

An L-shaped flange 35 has a pair of rods 32" and 32'" fixed thereto. The rods 32" and 32'" are slidably mounted in sleeve 30" and 30'". The L-shaped flange 35 has a pair of sleeves 36 and 36' fixed thereto. The L-shaped flanges 25 on the other side of the raft have a bore 37 therethrough. A rod 38 passes through the bores 37 in the other two flanges 25 and through the sleeves 36 and 36" on the L-shaped flange 35, to thereby pivotally mount the L-shaped flanges 35, the pair of rods 32" and 32'", the sleeves 30" and 30'", and the enlarged chamber 27, and small pipes 28 and 29 to the other two of the four rods 22 of the raft.

The enlarged chamber 27 and pipes 28 and 29 may be pivoted from a horizontal to a vertical position by removing either the rod 34 or the rod 38. If the rod 38 is removed the enlarged chamber 27 and the small pipes 28 and 29 may be pivoted about the rod 34 to a vertical position or if the rod 34 is removed, the enlarged chamber 27, small pipes 28 and 29 may be pivoted about the rod 38 to a vertical position.

The four rods 22 converge toward one another and are welded to a centerplate 40 and rod 41 is rotatably mounted in a bearing in the center plate. The lower end of the rod 41 has a plurality of blades 42 which are fixed to the rod 41 to form a propellor. Four braces 43 have their lower ends fixed to the outer ends of rods 22 and their upper ends converging toward one another and one welded to the center plate 44. The upper end of the rod 41 is rotatably mounted in a bearing in the center plate 44.

A pair of curbed panels 45 are fixed to the upper portion of the rod 41, and a similar pair of curved panels 46 are fixed to the rod 41 immediately below the panels 45. The panels are wind driven to rotate the shaft 41 to rotate the propellor.

A threaded rod 47 is threaded rotatably mounted to rotate in the flange 31 and has an enlarged collar 47' so that the rod can not move downward relative to the flange 31 and threads into a threaded bore in a lug 48, which lug 48 is fixed to the side of the enlarged chamber 27, whereby turning the threaded rod 47 in one direction will draw the lug 48 upward to draw the enlarged chamber and the pipes 28 and 29 upward relative to the flange 31 with rods 32 and 32' sliding in the sleeves 30 and 30' to adjust the chamber 27 and pipes 28 and 29 upward, relative to the L-shaped flanges 31 turning the threaded rod in the opposite direction moves the lug 48 downward, thereby moving the enlarged chamber 27, and pipes 28 and 29 downward relative to the L-shaped flange 31 with the rods 32 and 32' sliding in the sleeve 30 and 30'.

A threaded rod 51 is threaded rotatably mounted into flange 35 and has an enlarged collar 51 so that the rod cannot move downward into flange 35 and is threaded into a bore in a lug 50, which lug 50 is fixed to the side of the enlarged chamber 27, whereby the turning of the threaded rod 50 in one direction will draw the lug 50 upward to draw the enlarged chamber 27, pipes 28 and 29 upward relative to the flange 38 with the rods 32" and 32'" sliding in the sleeves 30' and 30'" upward relative to flanges 38. Turning the rod 50 in the opposite direction will lower the chamber 27 and pipes 28 and 29 relative to flange 38.

To raise and lower the chamber 27 and pipes 28 and 29 the rods 47 and 51 will be adjusted at the same time. To operate the device 21, the raft 21 will be placed in a lake. The device will float on the four floats 23 at approximately the water surface level, as indicated by line 54.

Figure 2:
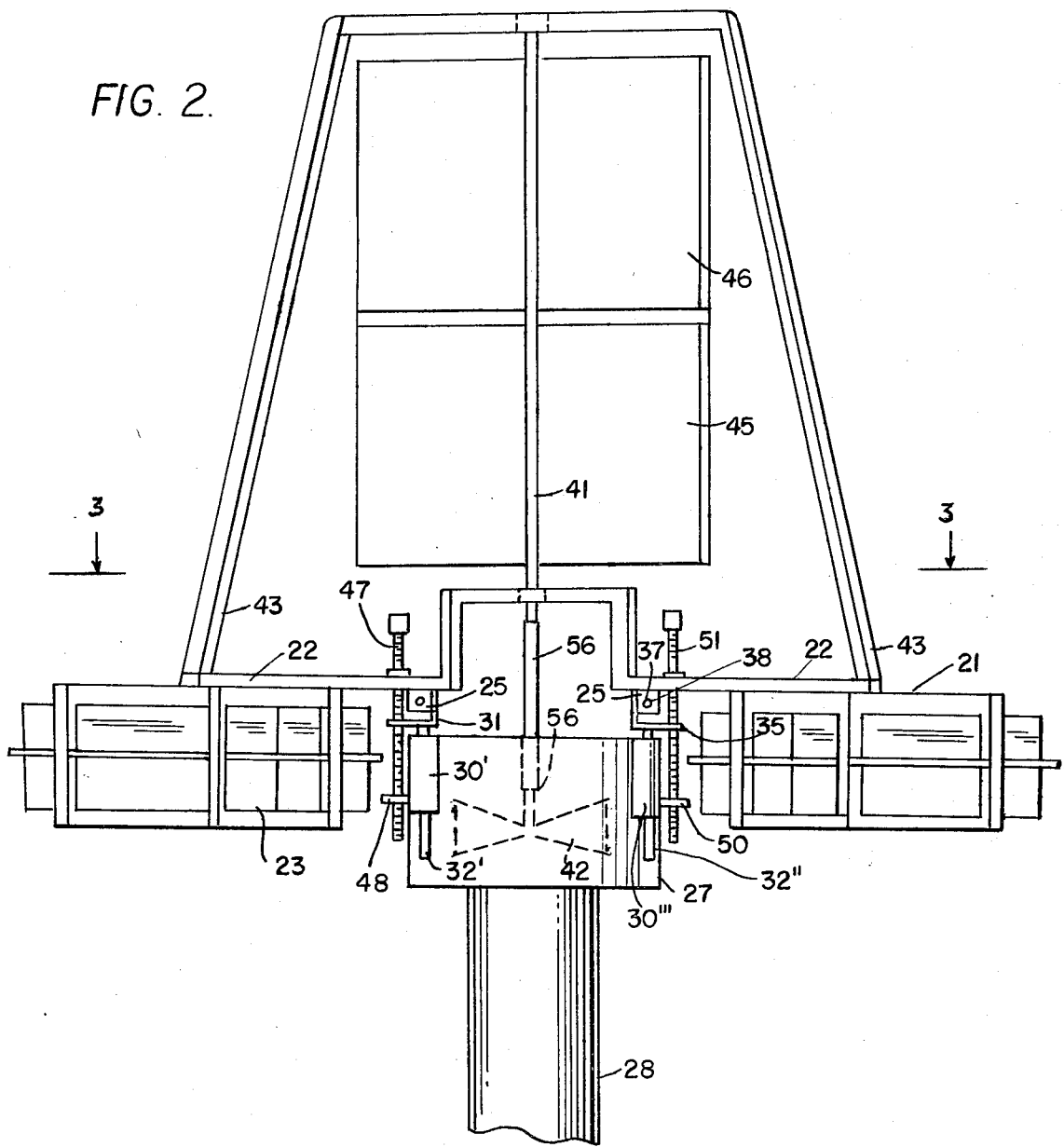
FIG. 2 is a side elevational view of the pumping device with the pivotally mounted telescoping pipe.
Figure 3:
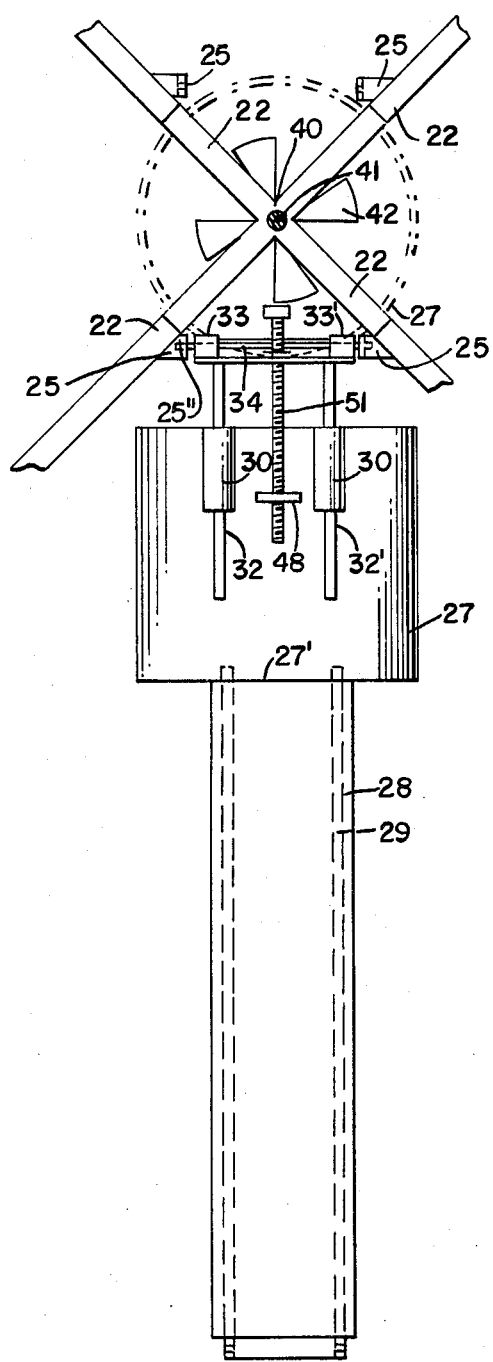
FIG. 3 is a fragmentary cross-sectional view of the pumping device lake along line 3—3 of FIG. 2.

To install the device into a lake, the rod 38 will be removed and the annular chamber 27 and pipes 28 and 29 will be positioned in a horizontal position with the chamber 27 pivotally connected to flange 31 by rod 34 connecting the two together. The raft 21 will be slid out onto the lake to an open hole in the ice in the lake where it is desired to locate the raft 21, and the raft 21 is slid into the open water in the hole. The hole in the ice will be large enough to allow the chamber and pipes to pivot downward to a vertical position pivoting about rod 34. A rope will be attached to the lower end of the inner pipe 29 and the lower end of the pipe 29, with pipe 28 and chamber 27, will be pivoted to a vertical position, as illustrated in FIGS. 1 and 2. If there is no ice the chamber and pipes 28 and 29 will be towed in a horizontal position by a rope connecting between the pipe 29 and braces 43 and when the raft is located in the desired position the rope will be untied and the chamber 27 and pipes 28 and 29 are allowed to pivot downward to a vertical position. The rod 38 will then be reinstalled to connect the chamber 27 to flange 35 to lock the chamber and pipes in a vertical position.

Ropes will be attached to the inner pipes lower end from the outside to draw the pipe 29 upward and downward to adjust the pipe 29 so that the down end of the pipe 29 is close to the bottom of the lake.

The wind will engage the panels 45 and 46 to rotate the shaft 41 to rotate the propellor 22 to draw water from the bottom of the lake through the pipes 28 and 29 into the annular chamber and over the top of the annular chamber 27 back into the lake at the surface of the lake to circulate the water in the lake and aerate the water in the lake.

A portion 56 of the shaft 41 where the shaft 41 passes through the surface 54 of the lake will be coated with a plastic, such as P.T.F.E., which it has been found prevents the shaft from freezing to any ice that may form on the surface of the lake about the shaft. The ice does not freeze to the P.T.F.E. very readily.

Thus, it will be seen that a novel pumping device for pumping water from the bottom of the lake to circulate and aerate the water in the lake has been provided which has a pivotally mounted enlarged chamber and small telescoping pipes to make it easier to move the raft into the lake with the enlarged chamber and telescoping pipe in a horizontal position.

It will be obvious that various changes and departures may be made to the invention without departing from the spirit thereof and accordingly it is not intended that the invention be limited to that specifically described in the specification or as illustrated in the drawing, but only as set forth in the appended claim wherein.

What is claimed is:

1. A pumping device for pumping water from the bottom of a lake to the top of the lake for circulating water comprising raft means, said raft means comprising a plurality of floats mounted at spaced intervals to one another, elongated pipe means on said raft means extending vertically downward, a wind driven shaft rotatably mounted on said pipe means with a propeller at the lower end of the shaft within the upper end of the pipe means, whereby rotation of the shaft by the wind rotates the propeller to draw water up through the pipe means from the bottom of the lake out of the top of the pipe means to circulate the water, said pipe means being pivotally mounted at one upper end to said raft means, to pivot relative to said raft means about a horizontal axis at one of the spaced intervals between the floats from a horizontal position between said floats to a vertical position beneath said floats, locking means along the opposite upper end of said pipe means locking said pipe means to the raft means in a vertical position for use in circulating the water, said locking means when unlocked allowing the pipe means to be pivoted upward toward a horizontal position when not in use, said pivoting means and locking means being adapted to be reversed in function whereby said pivoting means may serve as said locking means and said locking means may serve as said pivoting means, said locking and pivoting means each having a vertical sliding connection to said pipe means with a threaded rod threadable to raise and lower the pipe means relative to the raft means on said vertical sliding connection.

* * * * *